H. COULSTON & W. M. SCHWARTZ.
MACHINE FOR REMOVING STOCKINGS FROM FORMS.
APPLICATION FILED MAY 14, 1913.
1,126,619.
Patented Jan. 26, 1915.
10 SHEETS—SHEET 3.
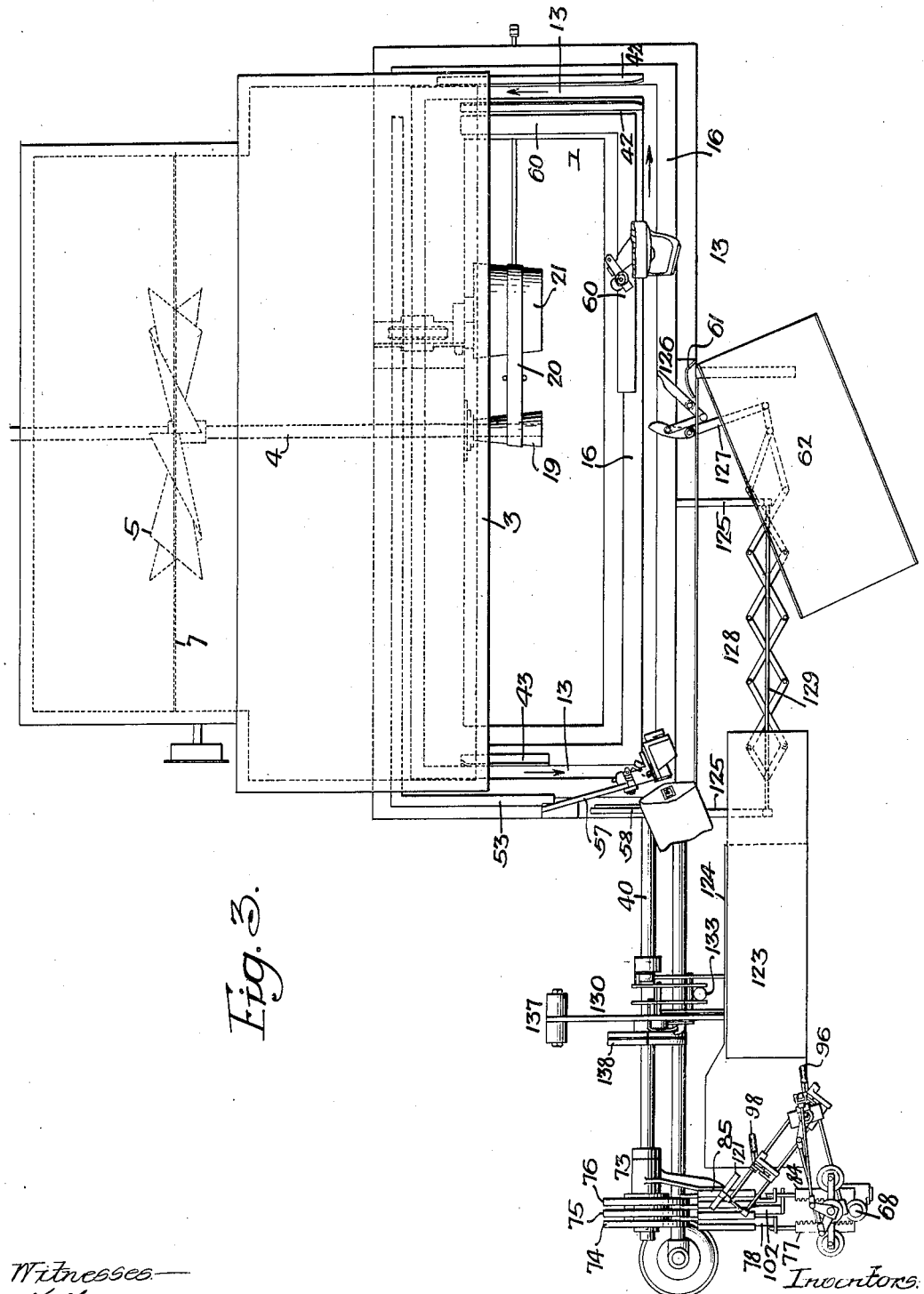
Fig. 3.
Inventors.
Harry Coulston, Walter M. Schwartz.
by their Attorneys.
Howson & Howson H. COULSTON & W. M. SCHWARTZ.
MACHINE FOR REMOVING STOCKINGS FROM FORMS.
APPLICATION FILED MAY 14, 1913.
1,126,619.
Patented Jan. 26, 1915.
10 SHEETS—SHEET 4.
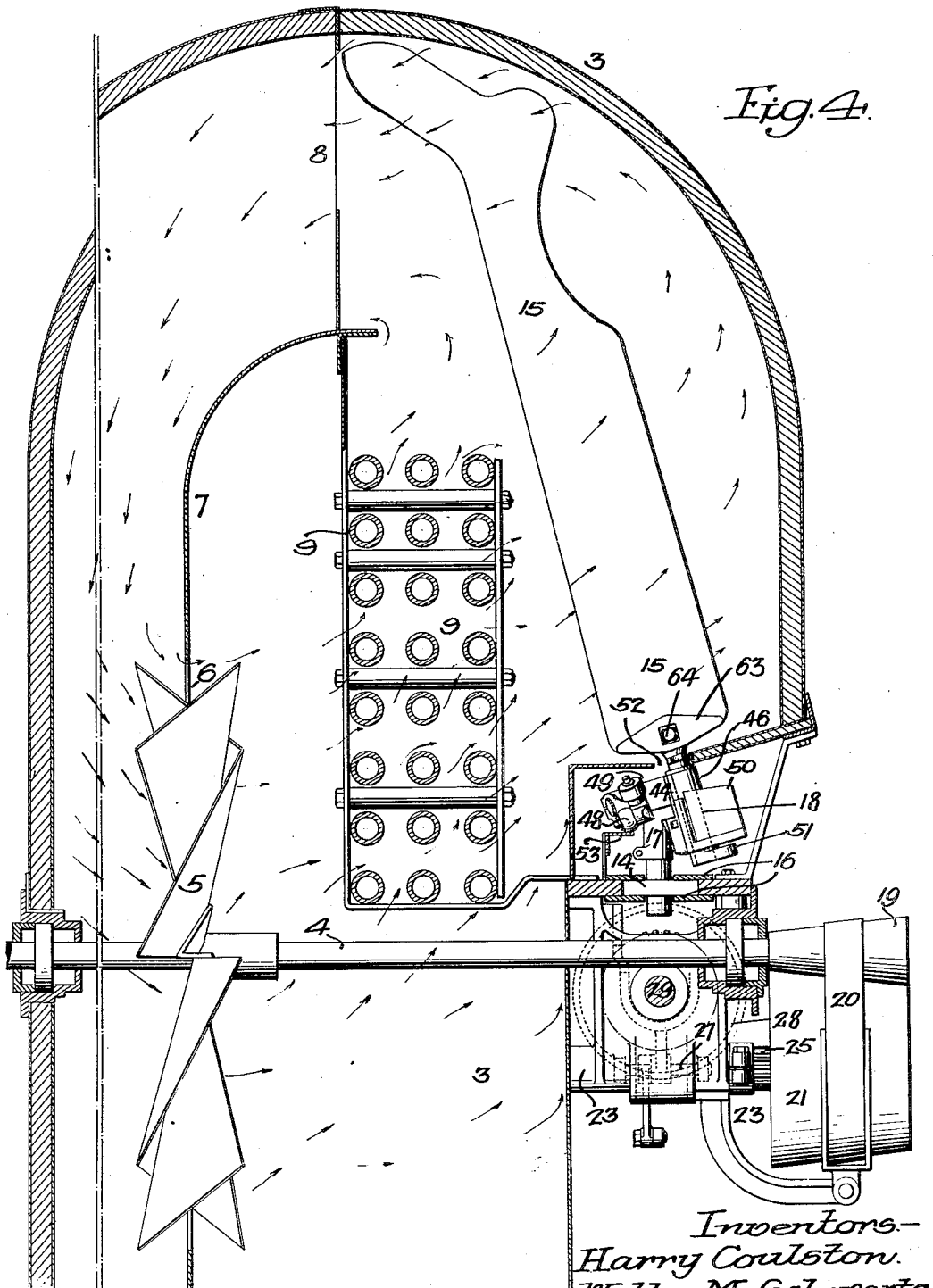
Witnesses
Willis H. Burrows
William T. Nax
Inventors
Harry Coulston
Walter M. Schwartz
by their Attorneys
Howson & Howson

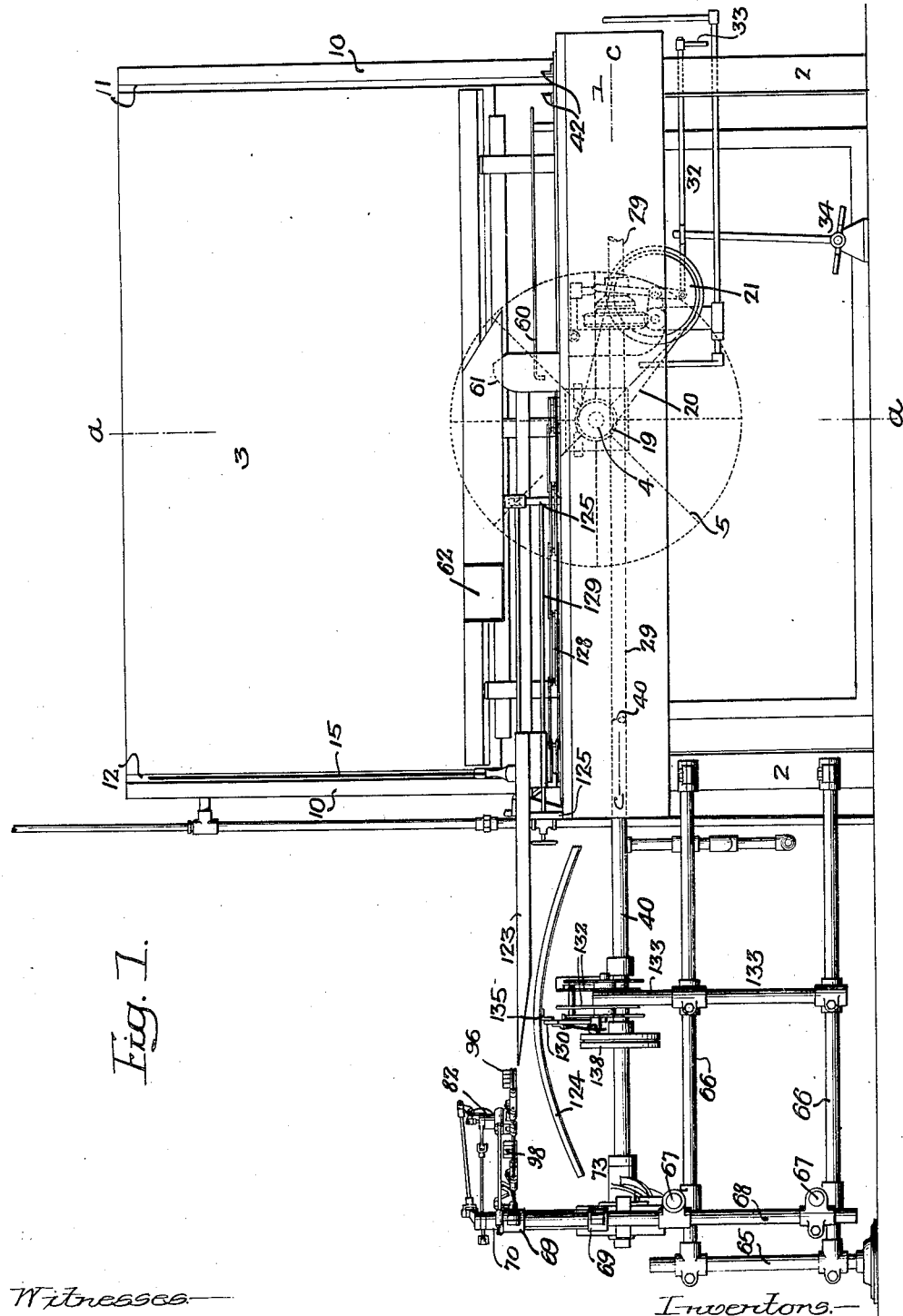

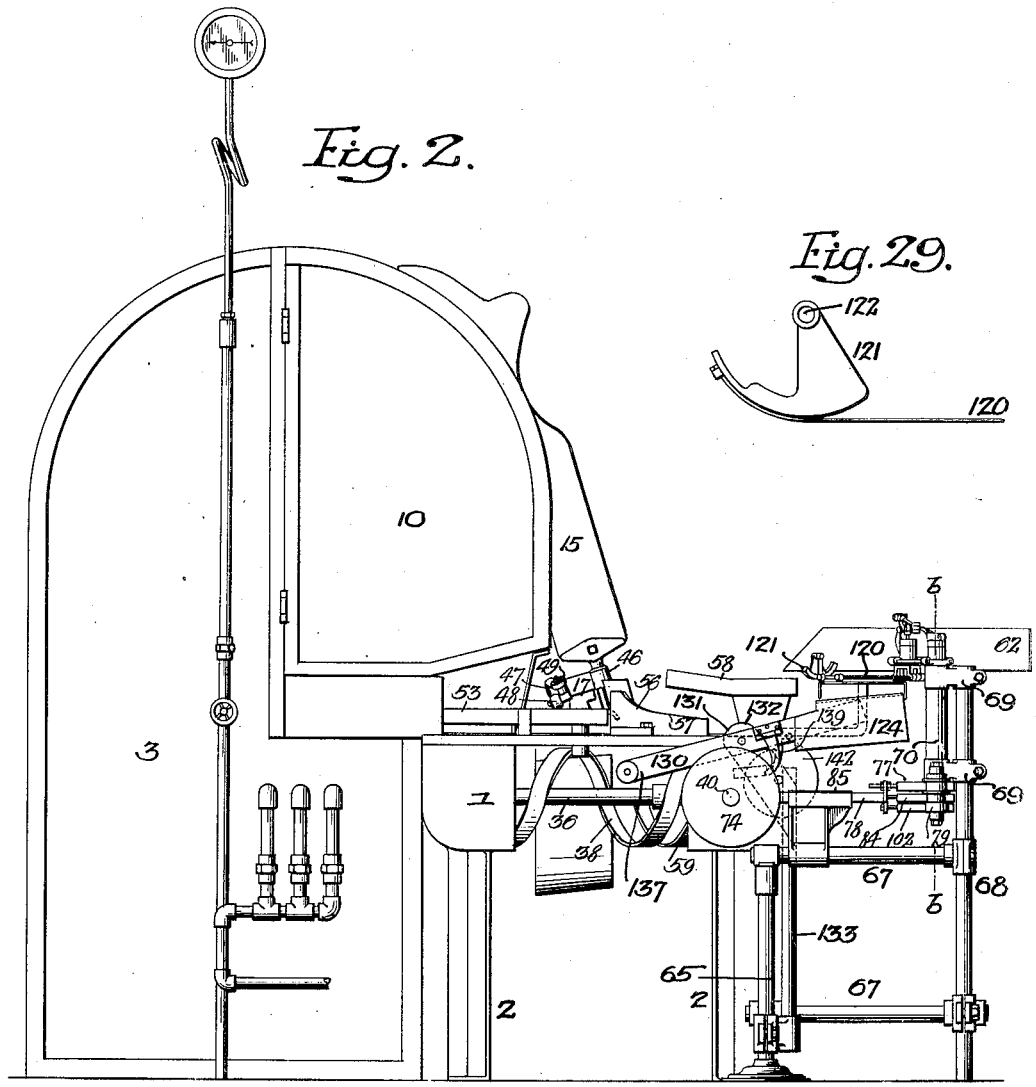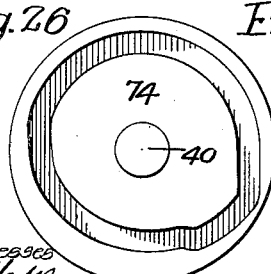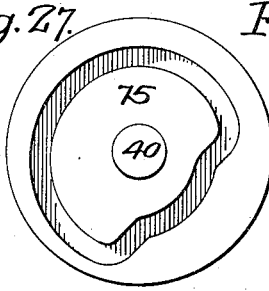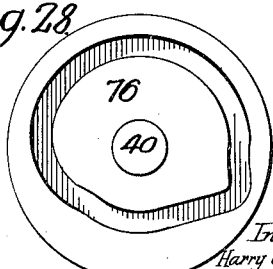

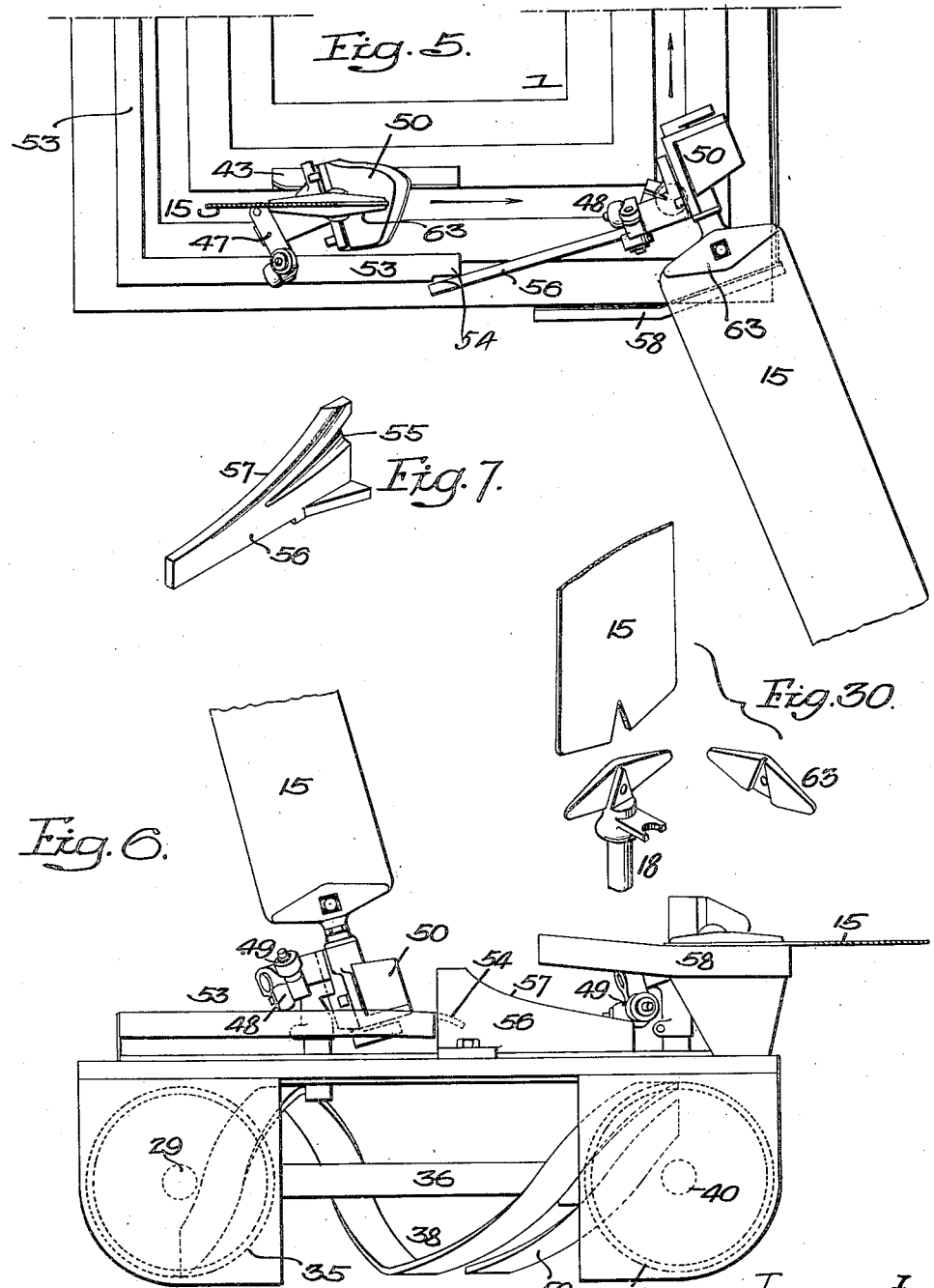

H. COULSTON & W. M. SCHWARTZ.
MACHINE FOR REMOVING STOCKINGS FROM FORMS.
APPLICATION FILED MAY 14, 1913.

1,126,619.

Patented Jan. 26, 1915.

10 SHEETS—SHEET 6.

Witnesses—

Inventors:—
Harry Coulston.
Walter M. Schwartz.
by their Attorneys
Howson & Howson

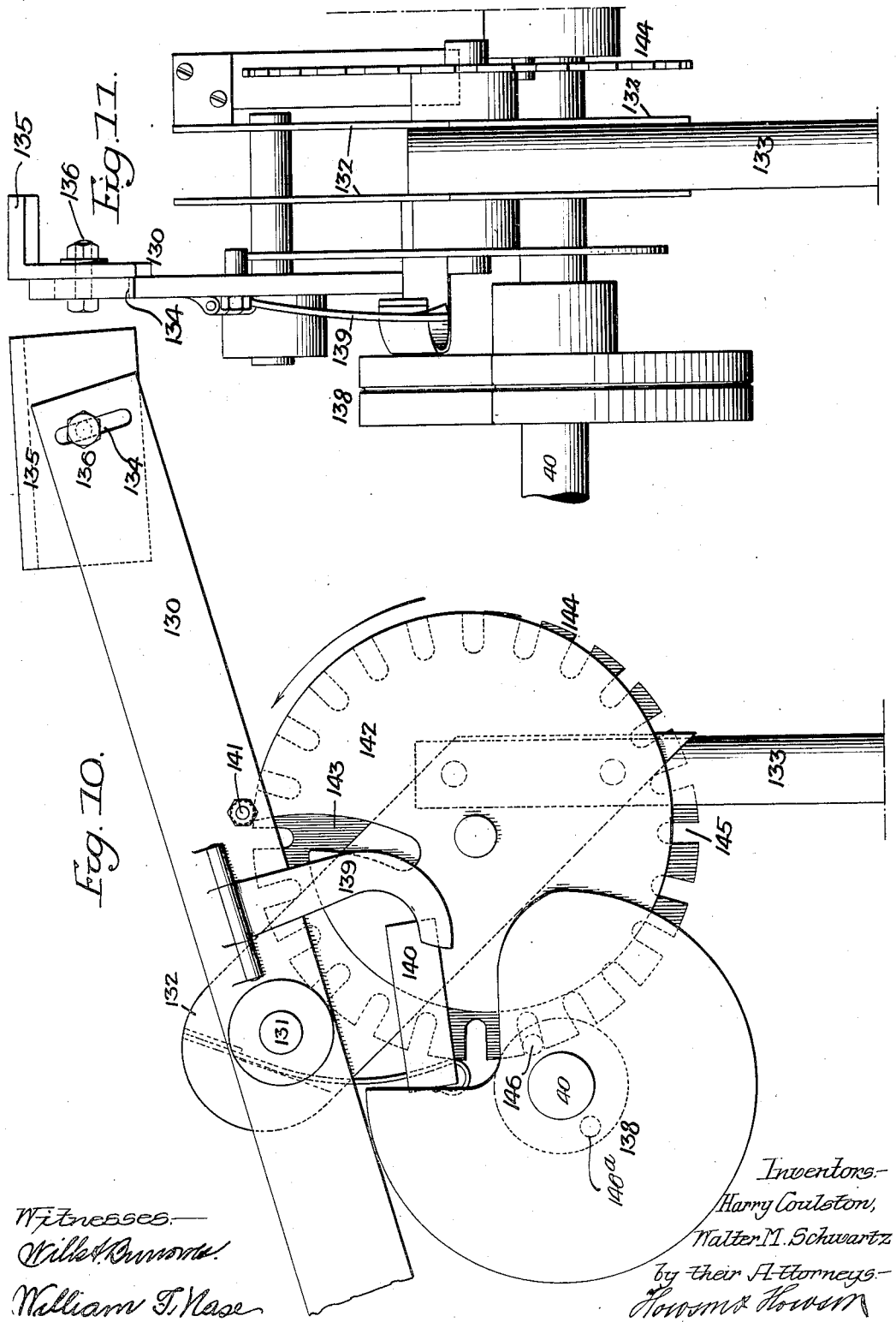

H. COULSTON & W. M. SCHWARTZ.
MACHINE FOR REMOVING STOCKINGS FROM FORMS.
APPLICATION FILED MAY 14, 1913.
1,126,619.
Patented Jan. 26, 1915.
10 SHEETS—SHEET 8.
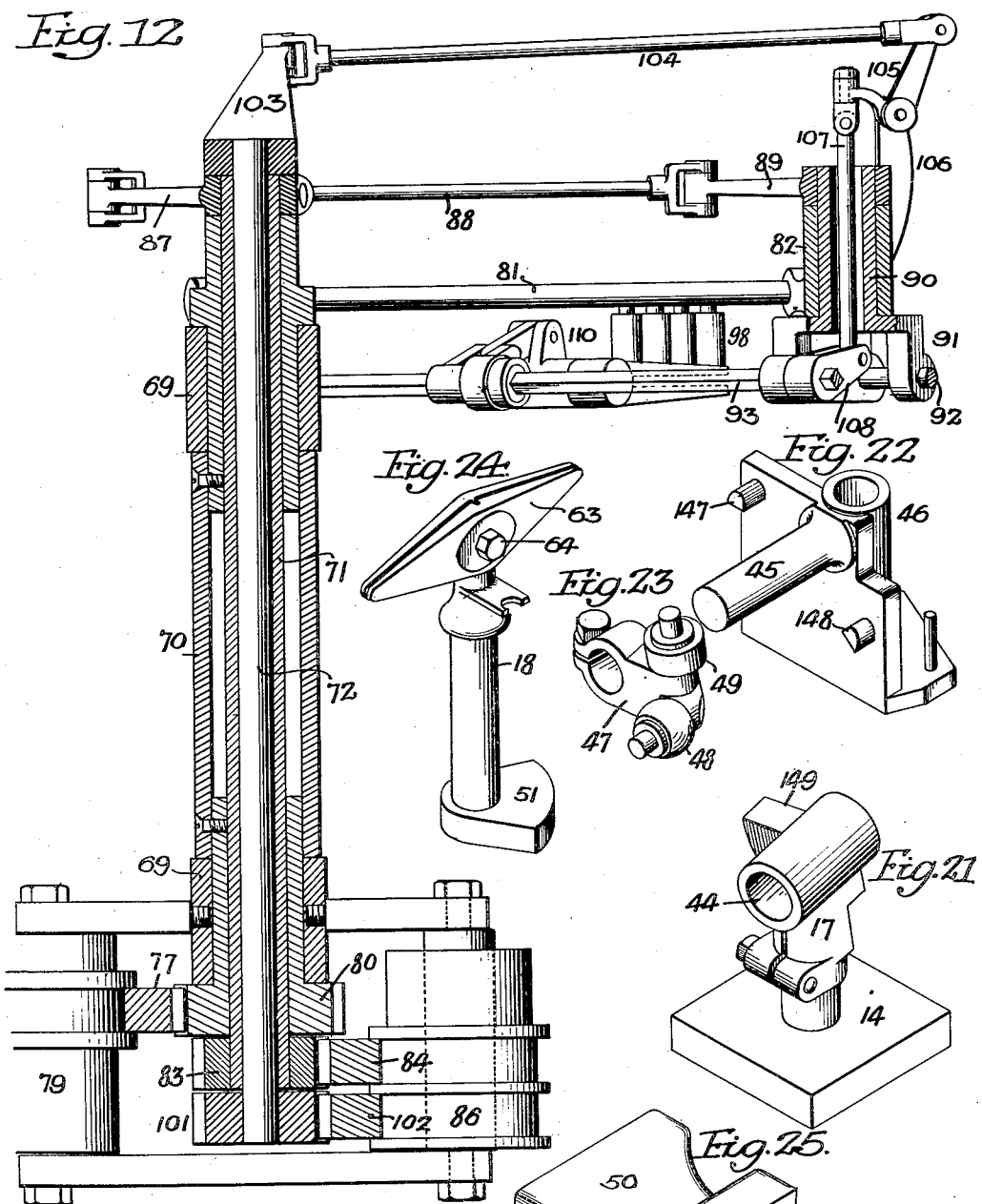

H. COULSTON & W. M. SCHWARTZ.
MACHINE FOR REMOVING STOCKINGS FROM FORMS.
APPLICATION FILED MAY 14, 1913.
1,126,619.
Patented Jan. 26, 1915.
10 SHEETS—SHEET 9.
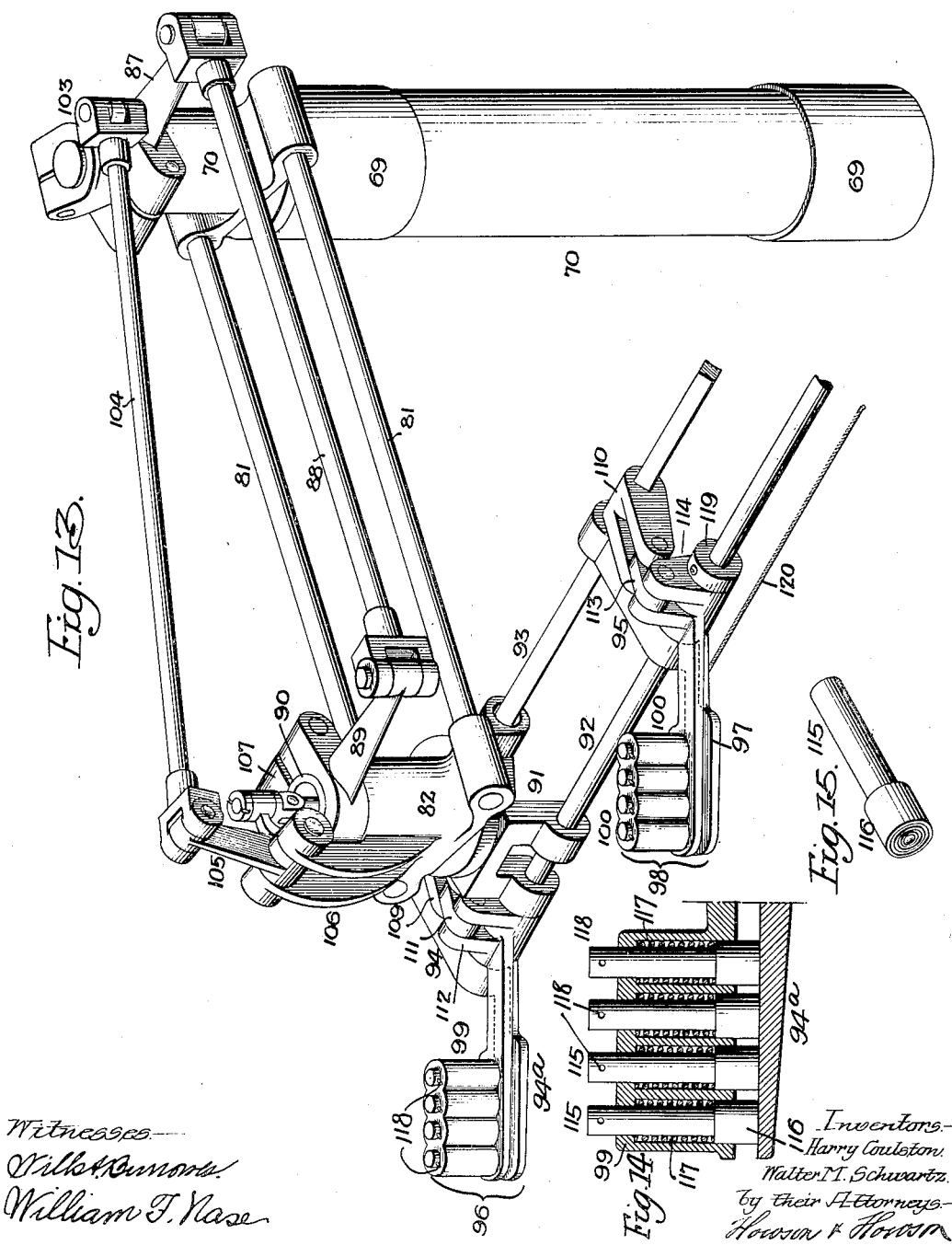

H. COULSTON & W. M. SCHWARTZ.
MACHINE FOR REMOVING STOCKINGS FROM FORMS.
APPLICATION FILED MAY 14, 1913.
1,126,619.
Patented Jan. 26, 1915.
10 SHEETS—SHEET 10.
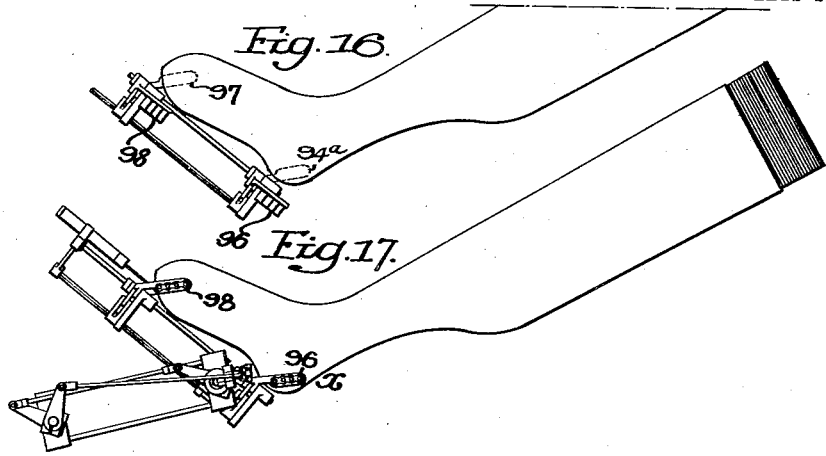
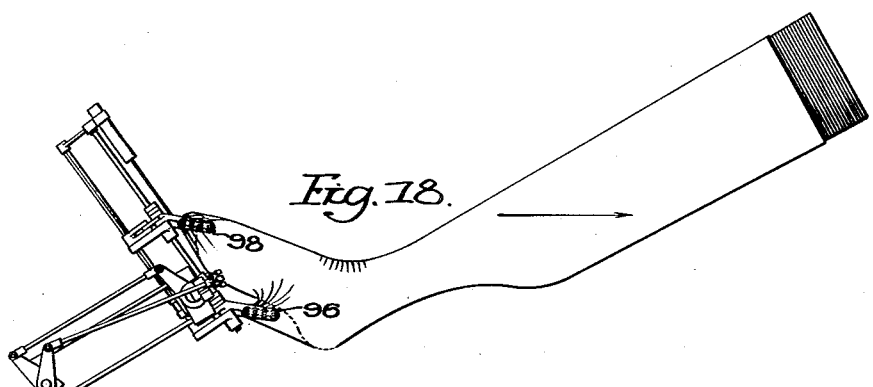
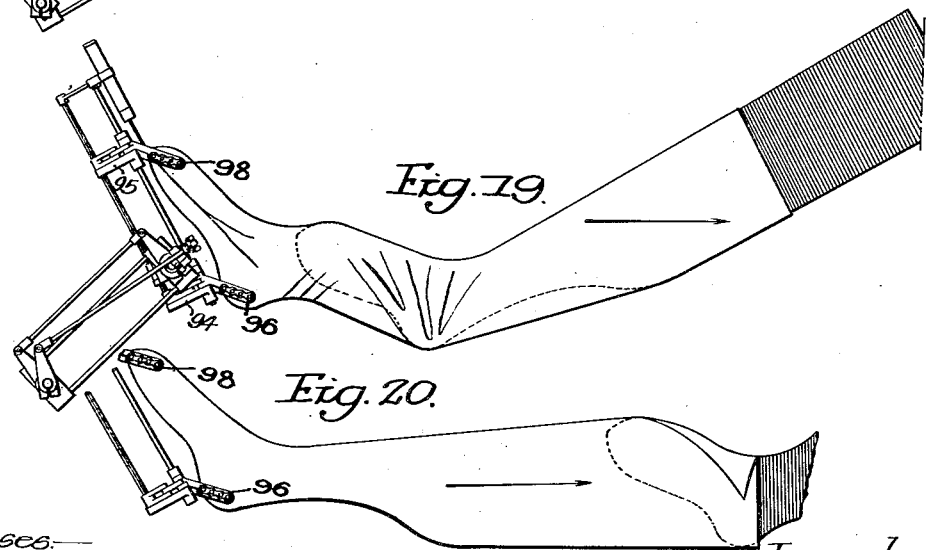

UNITED STATES PATENT OFFICE.

HARRY COULSTON AND WALTER M. SCHWARTZ, OF PHILADELPHIA, PENNSYLVANIA, ASSIGNORS TO THE PHILADELPHIA TEXTILE MACHINERY COMPANY, OF PHILADELPHIA, PENNSYLVANIA, A CORPORATION OF PENNSYLVANIA.

MACHINE FOR REMOVING STOCKINGS FROM FORMS.

1,126,619.  Specification of Letters Patent.  Patented Jan. 26, 1915.

Application filed May 14, 1913. Serial No. 767,649.

*To all whom it may concern:*

Be it known that we, HARRY COULSTON and WALTER M. SCHWARTZ, citizens of the United States, residing in Philadelphia, county of Philadelphia, State of Pennsylvania, have invented certain Improvements in Machines for Removing Stockings from Forms, of which the following is a specification.

Our invention relates to certain improvements in means for handling stockings during the manufacture of the same and particularly in connection with means for drying stockings, where the stockings are placed upon stocking forms.

The object of our invention is to provide means for automatically removing a stocking from the stocking form.

The invention also relates to improvements in means for carrying the stockings through a drying chamber and also relates to the means for piling stockings and discharging them intermittently in given quantities.

Figure 8:
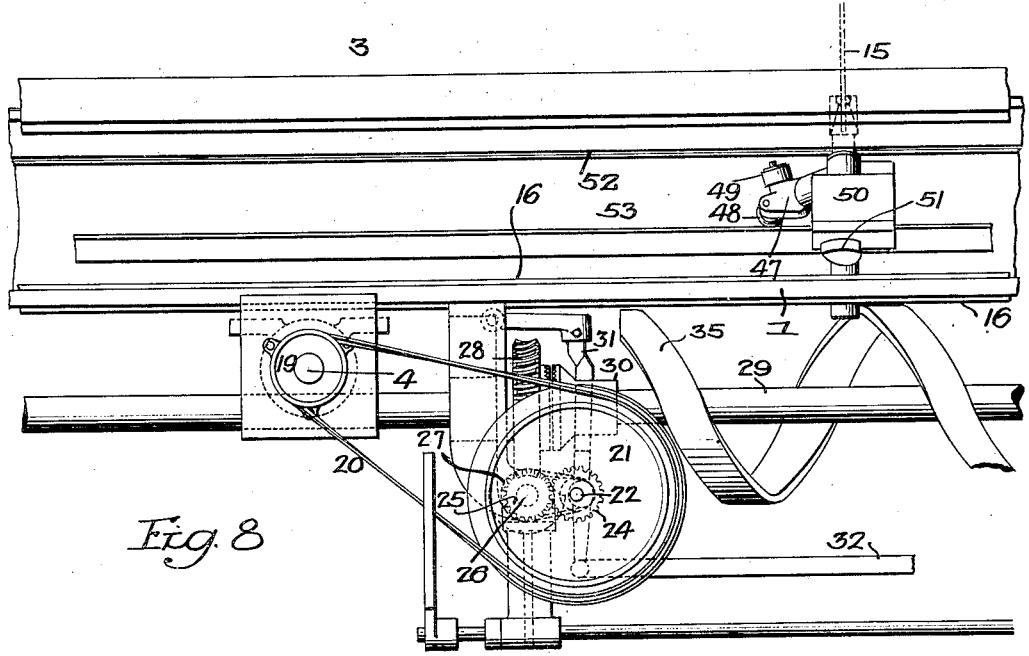
Figure 9:
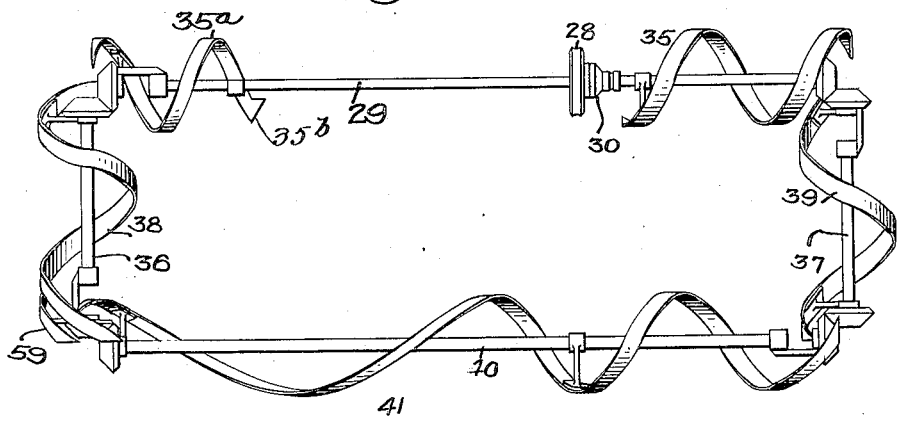

In the accompanying drawings: Figure 1 is a front view illustrating our improved stocking drier and the mechanism for automatically removing the forms from the stockings; Fig. 2 is an end view; Fig. 3 is a plan view; Fig. 4 is an enlarged transverse sectional view of the drier on the line *a—a*, Fig. 1; Fig. 5 is a plan view of one end of the machine showing the carriers and a part of the track; Fig. 6 is a view, in elevation, of the mechanism illustrated in Fig. 5; Fig. 7 is a detached perspective view of the cam plate illustrated in Fig. 6; Fig. 8 is a longitudinal sectional view illustrating a portion of the driving mechanism for the carriers; Fig. 9 is a sectional plan view on the line *c—c*, Fig. 1, illustrating the cam shafts; Figs. 10 and 11 are views illustrating the counting mechanism connected to the table on which the stockings are placed after the parts are withdrawn; Fig. 12 is a vertical sectional view on the line *b—b*, Fig. 2, showing the mechanism for gripping the toe and the heel of a stocking; Fig. 13 is a perspective view of the upper portion of the toe and the heel gripping mechanism; Fig. 14 is a sectional view of one of the grippers; Fig. 15 is a perspective view illustrating one of the plungers of the grippers; Figs. 16 to 20, inclusive, are diagrammatic plan views illustrating different steps in the process of gripping a stocking and removing the form therefrom; Figs. 21 to 23, inclusive, are detached perspective views of the carrier and the parts mounted thereon; Fig. 24 is a perspective view of the spindle, which is attached to the stocking form; Fig. 25 is a perspective view of the counterweight; Figs. 26, 27, and 28 are face views of the operating cams of the grippers; Fig. 29 is a view of the counterweight for the toe gripper, and Fig. 30 is a detached perspective view of the clamping head and the lower portion of the form.

Before proceeding with the description of the construction of the machine, we will refer particularly to Figs. 16 to 20, inclusive, which show different steps in the process of removing the stocking form from a stocking, the process being fully set forth and claimed in an application for patent filed by Harry Coulston on the 26th day of February, 1913, Serial No. 750,873.

In the present instance, the apparatus is used for removing stocking forms from stockings after the stockings have been dried in a drying chamber. The form, with a stocking thereon, is automatically placed between the grippers which grasp the heel and toe of a stocking and hold it while the mechanism withdraws the form from the stocking. The gripper for the toe yields so as to allow the heel grip to remove the heel of a stocking first, after which the heel and toe of a stocking are held while the movement is continued, the toe and heel grippers assuming a different position so that a stocking, after the form is removed, is at a different angle from that at which it was first placed in the grippers. When the form has been entirely removed, then a stocking is released from the grippers and is dropped upon a table. In the present instance, twenty-four stockings accumulate, one above another, on the table and are automatically discharged therefrom. The form is then traversed to a position where another stocking is placed thereon, after which it is traversed to a position where it is located between the grippers and the above operation is repeated.

We will first describe the construction of the drying chamber, the endless way, and the carriers for the stocking forms, and will refer particularly to Figs. 1 to 6 inclusive.

Referring to the drawings, 1 is the bed of the machine supported on legs 2, in the present instance, and directly back of the bed is the drying chamber 3. This drying chamber consists of a frame and plates and is mounted on the floor. The upper portion is rounded and the front of the drying chamber projects over the rear edge of the bed. This construction allows the stocking forms to travel in the drier, while the carrier travels in guides at the rear of the bed. Extending transversely through the drier is a shaft 4, on which is a fan 5 made in the ordinary manner. This fan is located in an opening 6 in a partition 7 curved at the upper end, as shown, and in the partition is an opening 8 near the upper end of the drier.

9 is a nest of steam pipes located in front of the fan, in the present instance, and, as the shaft, with the fan thereon, rotates, a current of air will travel through the drying chamber in the manner indicated in Fig. 4.

10—10 are doors, one located at each side of the drying chamber, and hinged to the body portion, as shown in Fig. 2. When the doors are opened, access can be had to the interior of the drying chamber.

11 and 12 are vertical slots in the front wall of the drying chamber and are so located that a door forms one wall of each slot. These slots are for the purpose of allowing the flat stocking forms, with the stockings thereon, to enter and leave the drying chamber, as the machine is traversed in an endless path.

It will be understood that while this particular form of drier is used in carrying out the invention, other types of driers can be employed, if desired.

The bed 1, in the present instance, as illustrated in Fig. 3, is quadrangular in shape and in the bed is an endless way 13 in which slide carriers 14, which support the stocking forms 15. The guides are formed by two sets of overhanging plates 16, as clearly illustrated in Fig. 4. By removing the top plates, the carriers can be readily detached, if necessary. On each carrier is a head 17 for the spindle 18 to which the stocking form 15 is attached. This stocking form is free to turn in the head and the head is free to swing on the carrier. Thus, the stocking forms can be turned to pass through the narrow slots in the drier casing and the entire board and head can be turned to a horizontal position when the carrier has reached a point where the grippers act to hold the stocking as the form is removed therefrom.

The carriers are driven through the ways by mechanism similar to that set forth in the patent granted to us on the 25th day of February, 1913, and numbered 1,054,459.

The fan shaft 4 is the driving shaft and on this shaft is a cone pulley 19 around which passes a belt 20 to another cone pulley 21 on a shaft 22 having bearings 23, Fig. 4. On the shaft 22 is a gear wheel 24 which meshes with a gear wheel 25 on a shaft 26 adapted to bearings 23 and on this shaft is a worm 27 which meshes, in turn, with a worm wheel 28, loose on the cam shaft 29. This cam shaft has a clutch 30 thereon which is arranged to engage the teeth on the hub of the worm wheel 28 and the clutch is controlled by a lever 31 connected by a rod 32 which can either be operated by a handle 33 or by a treadle 34, illustrated in Fig. 1. On the cam shaft 29 are two ribbon cams 35 and 35$^a$. The shaft 29 is geared to two transverse shafts 36 and 37 having cams 38 and 39 respectively thereon and these shafts, in turn, are geared to the shaft 40 in front of the machine which has a cam 41 of the form illustrated in Fig. 9. The cams are so shaped that during the travel of the carriers over the bed they will dwell at given points at the rear of the bed. The carriers accumulate and are pushed forward by one carrier bearing against another. This allows a number of carriers to remain in the drier until the stockings are properly dried. The cam 41 has an elongated steep section so that the form will be removed from a stocking on one revolution of the cam, the balance of the cam being so shaped that the forms will be moved slowly to allow the operator to place the stockings on the forms.

It will be noticed that the carriers and their heads are so made that the stocking form assumes the same inclined position while in the drier, as illustrated in Fig. 4, as it does in traveling through the guides at the front of the machine. This enables the operator to readily place a stocking on the form prior to entering the drier and the form is free to turn in the head so that the operator can properly place a stocking on a form in such manner that there will be no wrinkles in the stocking and either side of the stocking can be inspected prior to its entering the drying chamber.

When each carrier traverses to the extreme end of the way at the front of the machine, then it is released from the control of the cam 41 and is engaged by the cam 39 and guides 42 are provided, as illustrated in Fig. 3, which hold the stocking form in the proper position to pass through the slot 11 in the drier casing. After the form passes into the drier its carrier is engaged by a cam 35 which pushes one carrier in advance of another. The arrow head 35$^b$ on the cam 35$^a$ selects a carrier and the cam moves it forward. When the carrier reaches the end of the longitudinal slot at the rear of the bed 1, it is engaged by the cam 38 on the shaft 36 and a guide 43 holds the form in position so that it will readily pass out of the casing through the slot 12. Each carrier is constructed as follows: The head 17 of the carrier 14 has an inclined bearing 44 and mounted in the bearing is a spindle 45 projecting from a bracket 46 having a vertical bearing therein for the reception of the stem 18 which is secured to the stocking form. On the end of the spindle 45 is clamped an arm 47 on which are mounted two rollers 48 and 49, and resting in a shelf on the bearing bracket 46 is a detachable counterweight 50 for counterbalancing the stocking form. The weight may be made integral with the bearing bracket, if desired. On the end of the stem 18 is a projection 51 which is engaged by the guides 42 and 43 and which hold the form in the proper position to enter and leave the drier casing through the slots. This construction is illustrated in the detached perspective views 21 to 25 inclusive.

As illustrated in Fig. 4, the overhanging portion of the casing extends over the rear guideway in the bed and the spindle 18 passes through a slot 52, formed in the under side of the drier casing so that by this construction very little of the hot air which circulates in the casing is allowed to escape and the slots being narrow also tend to confine the air within the casing.

53 is a rail which extends along the rear of the bed 1 and above the slot and also extends at the delivery end of the bed, as illustrated in Fig. 3. The roller 48 rests upon this rail and prevents the stocking form from tilting laterally. After a stocking form has passed out of the slot 12, it is still under the control of the rail 53, but this rail has a depressed end 54 which allows the stocking form to swing laterally and the wheel 48 enters a groove 55 in the cam plate 56 (Fig. 7) and the form commences to move from the vertical to the horizontal position. When the bearing bracket is turned on its pivot, the roller 49 will rest on the upper cam surface 57 of the cam plate 56 and, as the carrier is moved forward, the roller 48 leaves the cam plate and when the roller 49 is opposite the end of the cam plate, the stocking form 15 is in the horizontal position, being supported by a fixed guide 58 projecting from the bed 1, as illustrated in Figs. 5 and 6.

In order to limit the movement of the bracket 46 on the carrier 14, we provide two stops 147 and 148 which engage a projection 149 on the head 17, Fig. 21. When the form is in the vertical position, the pin 147 engages the stop 149 and, with the counterweight holds the form in the vertical position. The stop pin 148 strikes the stop 149 and limits the movement of the form in the horizontal position.

In order to prevent the carrier from moving forward too rapidly when traversing over the cam plate 56, we provide a cam section 59 extending parallel with the cam 38 and mounted on the shaft 36 so that the projection of the carrier is held between the two cams 38 and 59, consequently, the carrier will be under the control of the said shaft 36. The carrier is now in the position to be traversed transversely across the front of the bed and, as it moves, the form 15 will be withdrawn from the stocking which has been engaged by the grippers. This movement is in the horizontal plane, as illustrated in the several diagrammatic Figs. 16 to 20, inclusive.

When a form is entirely removed from a stocking, the roller 48 strikes the end of a rail 60 and this causes the roller to roll over upon the rail at the same time a curved cam plate 61, which is located opposite the end of the rail, Figs. 1 and 3, turns the stocking form on its pivot so as to present its side to the operator. The form is now in a position for the operator to place another stocking thereon from a pile on the table 62. The roller 48 travels on the rail 60 holding the stocking forms in the proper position and the operation is repeated.

The stocking forms are detachably mounted on the spindle 18, said spindle having a clamp head 63 made in two parts between which a stocking form is held. A nut 64, on a centrally located bolt, secures the clamps to the form, Fig. 24. The fixed portion of the clamp head has a V-shaped projection and the movable portion has a V-shaped recess to fit over the projection while the lower end of the stocking form has a V-shaped notch adapted to the projection. When the parts are assembled, the form is held properly to the spindle.

In order to hold the stocking forms in the proper position while in the drier, we form an extension on the clamp directly below the form which fits the guideway and prevents the form, or its spindle, from turning so that the forms will travel through the drying chamber side by side. When the carriers are traveling in the forward guideway this extension is not engaged and, consequently, the form is free to be turned by the operator when placing a stocking thereon.

We will now proceed to describe the grippers for engaging the toe and heel portions of a stocking and the mechanism for operating the grippers. Referring to Figs. 1, 2, and 3 and Figs. 12 to 15, inclusive, at one end of the machine is located the mechanism for holding a stocking while the form is withdrawn therefrom. This mechanism consists of two grippers, one for the heel and one for the toe of a stocking and the mechanism is so arranged that if a stocking form, with a stocking thereon, is placed in the horizontal position the grippers are opened and the stocking rests on the lower member of each gripper, after which the upper member of the gripper is automatically moved over the stocking and sufficient pressure is applied so that when the stocking form is moved longitudinally the grippers retain the stocking and allow the form to be removed therefrom, the grippers releasing the stocking at the proper time to allow it to drop on to a support or table.

A frame projects from one end of the machine and consists of a post 65 to which are attached two horizontal rails 66, one end of each of which is attached to the leg 2 which supports the bed 1. Projecting from the rails 66 are rails 67 to which is attached a vertical post 68. Secured to this post by clamp bearings 69 is a hollow shaft 70. Within this shaft is a tubular shaft 71 and mounted within the tubular shaft is a solid shaft 72, Fig. 12. The cam shaft 40 which extends along the front portion of the bed projects laterally and is mounted in a bearing 73 secured to the framework above mentioned and on the shaft are three cams 74, 75, and 76, each having a cam way cut as illustrated in Figs. 26, 27 and 28. The cam 74 actuates the rack 77 through the slide 78 which has a pin provided with a roller which enters the groove in the cam 74. The rack is held by a grooved roller 79 mounted in brackets secured to one of the lower bearings 69, Fig. 12, and on the end of the tubular shaft 70 is a pinion 80 which meshes with the rack 77 so that the tubular shaft 70 is turned as dictated by the cam 74. The hollow shaft 70 is connected by two parallel rods 81 to a head 82 which carries the gripping mechanism so that on turning the hollow shaft 70, the gripping mechanism will be moved around the shaft 70 as a center. The object of this movement will be described hereinafter.

The tubular shaft 71 has a pinion 83 at its lower end, Fig. 12, with which meshes the teeth of a rack 84 which is connected to a rod 85 having a pin provided with a roller which enters the slot in the cam 76. A flanged roller 86 holds the teeth of the rack in mesh with the teeth of the pinion 83. On the upper end of the tubular shaft 71 is an arm 87 and this arm is connected by a rod 88 to an arm 89 secured to the upper end of the tubular spindle 90 of a head 91 which carries the two rods 92 and 93 on which the grippers are mounted. The rod 92, in the present instance, is round and the rod 93 is square. Carried by the two rods 92 and 93 are two bearings 94 and 95. The bearing 94 carries the fixed portion 94ª of the heel clamp 96 and the bearing 95 carries the fixed portion 97 of the toe clamp 98. While the rod 92 is rigid, the square rod 93 turns in the bearings 94 and 95, and in the head 91, and actuates the movable portions 99 and 100 of the heel and toe clamps 96 and 98.

The shaft 72 has a pinion 101 at its lower end which meshes with the teeth on the rack 102, held in place by the roller 86 and connected to a rod 102ª having a pin and roller which enters the slot in the cam 75. At the upper end of the shaft 72 is an arm 103 connected by a rod 104 to one arm of a bell crank lever 105 having its bearings in a bracket 106 projecting from the head 82. The other arm of the bell crank lever 105 is connected by a rod 107 which extends through the hollow spindle and is connected to an arm 108 mounted on the square rod 93 so that, when the shaft 72 is turned, the square rod 93 is also turned.

Mounted on the rod 93 are two arms 109 and 110. The arm 109 is connected by a link 111 to an arm 112 projecting from the movable heel gripper 99, while the arm 110 is connected by a link 113 to an arm 114 of the movable toe gripper 100. Each movable gripper 99 and 100 is pivoted on shaft 92, as illustrated in Fig. 14.

115 is a series of plungers having heads 116 forming shoulders. Back of the heads are coiled springs 117 which force the plungers against the fixed gripping member. The pins 118 limit the movement of the plungers when the movable gripping member is raised. The under side of each plunger is ribbed, or otherwise roughened, as indicated in Fig. 15, so as to engage the fabric of the stocking without having to place too great a pressure upon the fabric which would tend to prevent the withdrawal of the form. Thus it will be seen that by shaping the cams 74, 75 and 76, the gripping members can be actuated in time with the movement of the carriers on which the stocking forms are mounted so as to allow a form, with a stocking thereon, to be placed in position, after which the grippers are closed upon the stocking and moved laterally so as to allow each form to be removed from a stocking with the least strain upon the fabric.

It will be noticed that the bearing 95 carrying the toe gripper 98 can slide on the rods 92 and 93 and this movement in one direction is limited by a collar 119 adjustable on the rod 92. Connected to the bearing 95 is a cord 120 attached to a weighted segment 121 pivoted at 122 to a bracket secured to the rod 92 and illustrated in Fig. 29. The object of this construction is to allow the two grippers to move toward the heel gripper as the heel of the stocking form is moved from the heel of the stocking. The segment 121 can be weighted, as desired, and will yield, but will not pull the gripper from the stocking. As soon as the toe portion of the form leaves the toe portion of the stocking the weight returns the toe gripper to its normal position.

Referring to Figs. 16 to 20, inclusive, Fig. 16 illustrates the position of the toe and heel grippers when a form, with a stocking thereon, is placed in position, the upper members of the grippers being raised so as to allow the form to rest upon the fixed or lower members. Fig. 17 illustrates the upper grippers moving over the stocking, with the form in position to be removed therefrom. Fig. 18 illustrates the first movement of the form, the toe of the form moving out of the toe of the stocking. In this position the heel is moved first, the toe gripper moving toward the heel gripper in order to allow the portion $x$ of the stocking (Fig. 17) to pass the heel of the form. The form does not move longitudinally in a direct line with the leg of the stocking, but moves in the direction of the arrow at an angle to the toe and heel, making it much easier for the foot portion of the form to leave the stocking than if moved in the direction of the length of the stocking. After the wide portion of the form has been withdrawn from the foot of the stocking, as in Fig. 19, then the weight 121 returns the toe gripper until it comes in contact with the stop 119, there being sufficient tension on the foot of the stocking to hold it in the proper position while the foot portion of the form passes through the narrow ankle portion of the stocking and finally through the leg portion of the stocking.

It will be noticed upon referring to Fig. 19 that the foot portion of the form bears such a relation to the grippers that as it is withdrawn through the leg portion of the stocking it acts as a spreader so as to remove any wrinkles and it will leave the stocking in a comparatively flat condition. The grippers not only hold the stocking, but also turn on the pivot assuming the position illustrated in Figs. 19 and 20, which allows the stocking to assume a position parallel with the movement of the stocking form. The cam mechanism is so formed that when the form leaves a stocking, the grippers release the toe and heel and allow the stocking to drop upon the movable platform 123 normally resting directly above the curved table 124. The platform 123 is guided by a rod 129 supported by brackets 125 projecting from the bed of the machine, and is moved into and out of position by a lazy tongs 128 connected to one arm of a lever 127 pivotally mounted on the bed and the short arm of the lever is in the path of the carrier. The carrier strikes the arm after the stocking form leaves the stocking, retracting the platform 123. The grippers are opened at this point, allowing the stocking to drop onto the curved table 124. This withdrawal of the platform tends to spread the leg of the stocking and allows it to drop forward onto the table.

After the carrier passes the short arm of the lever 127, it strikes the long arm of the lever 126, which is also pivoted to the bed of the machine and is connected to the lever 127 by a link and the moment the carrier strikes this lever 126 the platform is again projected over the table and remains there until another stocking has been located in position and the form removed therefrom.

As one stocking after another is dropped onto the table, the table is lowered until a given number of stockings are piled thereon. Then these stockings are automatically discharged from the table by tilting the same and counting mechanism is arranged so as to insure a given number of stockings being discharged at intervals.

The means for operating the table and the counting mechanism is as follows: The table 124 is attached to one arm of a lever 130 pivoted at 131 to a bracket 132 secured to a post 133 attached to the rails 66. The lever 130 is slotted at 134 and on the under side of the table 124 is an angle bar 135 which is secured to the lever by a bolt 136 which passes through the slot 134 in the lever. By this means the table can be adjusted to any angle with respect to the platform and can be raised and lowered to a limited extent. The lever 130 has a counterweight 137, in the present instance, so that the table will normally rest in the raised position. In the present instance, we have provided adjustable counting mechanism so that twenty-four stockings, or any desired number, will accumulate on the table before they are discharged therefrom.

On the shaft 40 is a cam 138 and on the lever is a hinged plate 139 and projecting back of the plate is a fixed guide 140 attached to the bracket 132. After twenty-four stockings have accumulated on the table, the lever swings on its pivot so that the stockings will slide off of the table and the hinged plate will be projected by the guide 140 in the path of the cam 138, the cam being notched to accommodate the plate when the lever turns, but the cam will immediately lift the lever through the medium of the plate and when the first stocking is placed in position a pin 141 passes onto the periphery of a cam 142, holding the lever in the raised position until the proper number of stockings are again placed on the table.

The cam 142 is shaped, as shown in Fig. 10, and has a slot 143 for the reception of the pin 141 when the lever 130 is lowered to discharge the stockings. The shape of the cam 142 is such that as each stocking is placed on the table, the table is lowered a given distance so that the top of the pile of stockings will always have the same relation to the platform 123.

144 is a disk having a series of notches 145 in its periphery. There are twenty-four notches, in the present instance, one for each stocking, and on the cam 138 is a pin 146 which enters one notch after another and acts as a star wheel in giving motion to the disk 144 from the shaft 40. By adding a pin 146ª, Fig. 10, twelve stockings will accumulate instead of twenty-four and the number of stockings accumulating may be regulated by the number of pins. Thus it will be seen that as the stockings are discharged onto the table, the table is slightly lowered and when twenty-four, or any number of stockings, have accumulated on the table, the mechanism tilts the table allowing the stockings to slide therefrom.

A bar, or other suitable device, is located at the side of the table and is arranged to receive the stockings as they are discharged. As soon as they have been discharged from the machine the operator removes them from the bar, or other support, and carries them away therefrom.

The general operation of the machine is as follows: The drying chamber is heated to the proper degree and the proper sized stocking forms are placed upon the carriers. The operator stands in front of the machine and carefully places the stockings on the forms and sees that they are drawn down evenly thereon. After a stocking is properly mounted on a form, it is carried forward by the conveying mechanism, then moved, on edge, through the slot in the drier and traversed therethrough. The forms accumulate in the drier until the last carrier pushes the first carrier into the path of the discharge cam at the opposite end of the machine. This cam engages the carrier and the forms pass out of the drier through the slot and are allowed to move into a horizontal position directly over the platform 123 with the toe of a stocking resting on the lower member of the toe and heel grippers. The upper members are then projected over the stocking and engage it at the toe and heel, while the carrier is moved longitudinally at the front of the bed and withdraws each form, in turn, from each stocking. As before remarked, the forms are withdrawn from the stockings at an angle to the longitudinal line of the leg so as to allow the foot of a form to be easily withdrawn from the foot of a stocking and from the narrow ankle portion of the stocking and as the foot portion of a form passes through the leg portion, it acts as a spreader pressing the stocking, removing the creases therefrom, and leaving it in a comparatively flat condition. When the carrier reaches a point where the form is about to leave a stocking, then it strikes a lever which withdraws the platform 123 and allows the stocking to drop onto the table 124. The grippers release the stocking immediately after it drops onto the table. As the carrier moves forward, it strikes another lever and projects the platform 123 to receive another stocking. One stocking after another is withdrawn from its form and is discharged onto the pile on the table, the table receding as the pile accumulates and, after a given number of stockings, in the present instance twenty-four, has accumulated on the table, they are automatically discharged by the table tilting and are then removed from the machine.

It will be understood that while we have shown means for drying stockings, as a drying chamber, with mechanism for conveying the forms, with stockings thereon, through the chamber, in some instances the chamber may be dispensed with and the heat may be applied directly to the stocking forms, or the stockings may be subjected to a current of hot air without using the inclosing chamber.

We wish to claim broadly, in this application, the means for automatically removing a stocking from a stocking form without limiting the invention to any specific means for drying the stockings. Furthermore, if it is desirable to singe the stockings on a form from which the stockings must be removed, the mechanism can be readily used in connection with a singeing apparatus.

In the description, we have used the technical term "form" on which the stockings are mounted, but it will be understood that these forms are suitably shaped and may be made of wood, metal, or other suitable material, and may be solid, or hollow, as found most expedient.

The drying mechanism for drying stockings by steam heat illustrated and described in this application is fully set forth and claimed in a companion application filed May 17, 1913, Serial No. 768,272, as we wish broadly to cover in this application the means for removing a stocking from a form irrespective of the method of drying the same or whether the mechanism is used in connection with a drier or other apparatus.

In the foregoing description and in the claims we have used the term "gripping mechanism" and by this we intend to cover and include any device which is designed to grip a stocking at the foot portion and either hold it, while the board is being removed, without rumpling the stocking to any extent, or to remove the stocking while the board is being held.

We claim:—

1. The combination in a machine for removing a stocking from a stocking form, of a form; means for positively gripping the foot portion only of a stocking, and mechanism for imparting longitudinal movement to one or the other of said parts, whereby a stocking is removed from the form.

2. The combination in means for removing stockings from stocking forms, of a form; a carrier therefor; means for traversing the carrier; and gripping mechanism for positively engaging and holding the foot portion of a stocking while the form is removed therefrom.

3. The combination in means for removing a stocking from a stocking form, of a form; a carrier therefor; and two grippers, one arranged to engage the heel and the other the toe of a stocking.

4. The combination in means for removing stockings from stocking forms, of a form; a carrier therefor, said carrier forming one element; two grippers arranged to engage respectively the toe and heel of a stocking, and forming the other element; and means for moving one of said elements to remove a stocking from its form.

5. The combination in a machine for removing stockings from stocking forms, of a form; a carrier therefor; two grippers; one engaging the toe and the other the heel of a stocking; means for holding the grippers; and means for traversing the carrier so as to remove the form from the stocking while it is held by the grippers.

6. The combination in a machine for removing stockings from stocking forms, of a form; a carrier therefor; two grippers; means for actuating the grippers, one of said grippers engaging the toe and the other the heel of a stocking; one of said grippers being free to move toward the other gripper during the first movement of the form from the stocking.

7. The combination in a machine for removing stockings from stocking forms, of a form; a carrier therefor; two grippers, one engaging the toe of a stocking and the other the heel thereof; and means for actuating the grippers; the toe gripper being independently movable with respect to the heel gripper, so that, on the first movement of the form as it leaves the stocking, the toe gripper will move toward the heel gripper to allow the heel portion of a stocking to be moved from the heel of the form.

8. The combination in means for removing stockings from stocking forms, of a form; a carrier; guides for the carrier; grippers engaging the foot portion of a stocking and arranged at an angle with respect to the guides; means for actuating the grippers; and means for moving the carrier along the guides in a line at an angle to the longitudinal line of the leg of a stocking, whereby the foot portion of the stocking form will pass through the ankle portion of the stocking and will spread the leg portion of the stocking.

9. The combination in means for removing stockings from stocking forms, of a form; a carrier therefor; a guide for the carrier; means for traversing the carrier in the guide; two grippers engaging the foot and the heel of a stocking respectively; means for actuating the grippers; a frame on which the grippers are mounted; and means for turning the frame as the form is withdrawn from the stocking.

10. The combination of a stocking form; a carrier therefor; a guide therefor; means for traversing the carrier in the guide; two grippers for engaging the heel and the toe of a stocking; means for actuating the grippers; a frame on which the grippers are mounted, the toe gripper being free to slide on the frame toward the heel gripper; and a counterbalance for said toe gripper, so that, as a stocking board is removed from a stocking, the toe gripper will move toward the heel gripper and, after the heel of the form has passed the heel of the stocking, the toe gripper will return to its normal position.

11. The combination of a form; a carrier therefor; a guide for the carrier; means for traversing the carrier in the guide; a frame; two grippers on the frame, one engaging the heel and the other engaging the toe of a stocking, the toe gripper being free to move toward the heel gripper; means for actuating the grippers; a pivot for the frame, said pivot being located near the heel portion; and means for turning the frame on its pivot as the stocking form is withdrawn from the stocking.

12. The combination of a stocking form; a carrier therefor; a guide for the carrier; means for traversing the carrier in the guide; two grippers; a frame on which the grippers are mounted; means for actuating the grippers to engage a stocking; a head on which the frame is pivotally mounted; means for turning the head; and means for turning the frame in the head.

13. The combination in means for removing stockings from stocking forms, of a carrier; means for actuating the carrier; two grippers, one arranged to engage the heel and the other the toe of a stocking; two rods on which the grippers are mounted; a head on which the rods are mounted, said head having a spindle; a second head in which the spindle is mounted; a hollow shaft rigidly connected to the second head; means for turning the said shaft; a tubular shaft mounted in the hollow shaft and connected to the spindle of the first mentioned head; means for turning the said tubular shaft; a shaft extending through the tubular shaft and connected to one of the rods carried by the first mentioned head; means connecting the said rod with the movable portion of each gripper; and means for turning the last mentioned shaft to open and close the grippers.

14. The combination in a gripper for engaging the foot of a stocking consisting of two fixed jaws and two movable jaws; bearings carrying the fixed jaws; rods on which the bearings are mounted; a head carrying the rods, one of said rods being free to turn in the head; movable jaws pivoted on the other rod; arms on the first mentioned rod connected to the movable jaws so that, when the said rod is turned, the movable portions of the grippers will be moved toward or from the fixed jaws of the grippers, the head having a hollow spindle; a second head in which the spindle is mounted; a hollow shaft; means connecting the hollow shaft with the second head so that, on turning the said hollow shaft, the head and the entire gripping mechanism will be rotated around the hollow shaft; an arm on the spindle of the first mentioned head; a tubular shaft mounted in the hollow shaft and having an arm; a rod connecting the two arms so that, on turning the tubular shaft, the first mentioned head will be rotated in the second head; a bracket on the second head; a bell crank lever pivoted to the bracket; a rod connected to one arm of the bell crank lever and an arm on the movable rod which supports the grippers and to which the other end of the rod is connected; a shaft extending through the tubular shaft and having an arm; and a rod connecting said arm with the other arm of the bell crank lever so that, on turning the shaft, the grippers will be opened and closed.

15. The combination in means for removing stockings from stocking forms, of a form; means for carrying the forms; grippers for engaging the foot of a stocking; a driven shaft: three cams thereon; three racks actuated by the cams; three vertical shafts having pinions thereon, the pinion of one shaft meshing with one rack, the pinion of another shaft meshing with another rack, and the pinion of the third shaft meshing with the third rack; a head to which one of said shafts is rigidly connected; a second head having a spindle mounted in the first mentioned head and connected to one of the other shafts, said second head carrying the gripping mechanism; and the movable jaws of the gripper connected to the third shaft of the series.

16. In a machine for removing stockings from stocking forms, the combination of a gripper for removing a stocking and consisting of a fixed member and a movable member; a plunger carried by one of said members; and springs for allowing the plunger to yield so that, when the gripper engages a stocking, it will exert a yielding pressure thereon.

17. In a machine for removing stockings from forms, the combination of a gripper for engaging a stocking consisting of a fixed and a movable member; a series of plungers carried by the movable member; springs mounted back of the head of each plunger; and means for limiting the outward movement of the plungers.

18. In a machine for removing stockings from stocking forms, the combination of a gripper having a movable and a fixed jaw; and a plunger mounted on one of said elements, said plunger having a ribbed face arranged to bear against the surface of the stocking.

19. The combination in a machine for removing stockings from stocking forms, of a form; a carrier; guides for the carrier; means for traversing the carrier; a gripper for engaging the toe of a stocking; means for turning the stocking form into a position to be engaged by the gripper; and means for actuating the gripper to engage a stocking so as to retain it and to allow the form to be removed therefrom on the cotinued movement of the carrier.

20. The combination in means for removing stockings from stocking forms, of a form; a carrier therefor; a guide for the carrier; means for traversing the carrier in the guide; means for holding the stocking form in the upright position during a portion of its travel in the guide; means for turning the form into a horizontal position during a certain portion of its travel; grippers for engaging the stocking on the stocking form when the form is in the horizontal position; and means for actuating the grippers.

21. The combination in means for removing stockings from stocking forms, of a form; a carrier therefor; a guide for the carrier; a pivotal connection between the stocking form and the carrier; means for traversing the carrier in the guide; a cam for turning the form on its pivot; a gripper for engaging a stocking on a stocking form after the cam has turned the form; and means for actuating the gripper.

22. The combination in means for removing stockings from stocking forms, of a form; a carrier; a pivotal connection between the carrier and the form; a right angled guide for the carrier; means for traversing the carrier in the guide; a cam for controlling the movement of the board from a vertical to a horizontal position; a gripper for gripping the toe and the heel portions of a stocking so as to hold the stocking while the carrier, with the form, continues its movement; and means for actuating the gripper.

23. The combination in a machine for removing stockings from stocking forms, of a form; a carrier therefor; a pivotal connection between the form and the carrier; an endless angular guide for the carrier; means for traversing the carrier in the guide; rails for supporting the carrier in the vertical position; a cam plate for controlling the movement of the form from the vertical to the horizontal position; gripping mechanism arranged to engage the foot portion of the stocking when the form is in the horizontal position, so that, upon the continued movement of the carrier and the form, the form will be withdrawn from the stocking; and means for actuating the gripping mechanism.

24. The combination in a machine for removing stockings from stocking forms, of a form; a carrier therefor; a pivotal connection between the form and the carrier; an endless angular guide for the carrier; means for traversing the carrier in the guide; a rail for retaining the form in the vertical position; a cam plate for controlling the movement of the form from the vertical to the horizontal position; a fixed guide for supporting the form in a horizontal position; grippers for gripping the foot end of a stocking when the form is in the horizontal position, so that, on the further movement of the form, it will be removed from its stocking; and means for actuating the grippers.

25. The combination in a machine for removing stockings from stocking forms, of a form; a carrier; a pivotal connection between the form and the carrier, said carrier having a projecting portion; a driven shaft; a cam thereon for traversing the form; a second cam on said shaft extending parallel with the first mentioned cam and forming a slot through which the projection on the carrier extends, so as to control the carrier; means for holding the form in a vertical position; means for moving the form into the horizontal position; grippers for engaging the foot end of a stocking when the form is in the horizontal position, so that, upon the continued movement of the carrier and the form, the form will be removed from the stocking; and means for actuating the grippers.

26. The combination in a machine for removing stockings from stocking forms, of a carrier; a guide therefor; a head on the carrier; a bearing in the head; a bracket having a spindle mounted in the bearing; an arm on the spindle; two rollers on the arm; a stocking form carried by the bracket; a rail on which one of the rollers travels while the stocking form is in a vertical position; and a cam plate for engaging both rollers to turn the stocking form from the vertical to the horizontal position.

27. In a machine for removing stockings from forms, the combination of a carrier; a guide therefor; a head on the carrier having a bearing; a bracket having a spindle mounted in the bearing; a stocking form; a clamp for the stocking form having a spindle mounted in the bracket; an arm on the end of the spindle; rails on the guide engaging the said arm; an arm on the first mentioned spindle; two rollers on the arm; a guide roller on which one of said rollers travels; and a cam plate engaged by both of said rollers when the stocking form is moved from the vertical to the horizontal position.

28. The combination of a carrier; guides therefor; a head on the carrier having a bearing; a bracket having a spindle mounted in the bearing; a counterweight mounted on the bracket; an arm on the spindle; two rollers mounted in the arm; a rail on which one of said rollers travels; a cam plate engaging both of said rollers; and a stocking form pivotally mounted in the bracket.

29. The combination of a carrier; a guide therefor; a head on the carrier having a bearing therein; a stop on the head; a bracket having a spindle mounted in the bearing and having two projections arranged to engage the stop; a stocking form carried by the bracket; and means for turning the bracket in its bearing, one projection on the bracket limiting the movement of the form when it is turned to the vertical position, and the other projection limiting the movement when it is turned to the horizontal position.

30. The combination of a carrier; a head having a bearing therein; a bracket having a spindle mounted in the bearing; a stocking form; a clamp secured to the stocking form; and a spindle on the clamp mounted in the bracket.

31. The combination in a machine for removing stockings from stocking forms, of a carrier; a guide; gripping mechanism engaging the foot end of a stocking when the form is turned to the horizontal position; means for actuating the gripping mechanism; a table for receiving a stocking; a platform normally resting above the table and arranged to receive stockings, one after the other, as they are released from the forms; means acting in conjunction with the forms for withdrawing the platform after the forms are withdrawn from the stockings; and means for replacing the forms in their normal position.

32. The combination of a carrier; a guide therefor; a stocking form mounted on the carrier; means for turning the form from the vertical to the horizontal position; gripping mechanism for engaging the foot end of a stocking when the form is turned to the horizontal postion; means for actuating the gripping mechanism; a table for receiving the stockings; a platform normally located above the table and arranged to receive the stockings as they are removed from the forms; means, actuated by the carrier, for withdrawing the platform after it has received the stockings; and means, also actuated by the carrier, for returning the platform to its normal position after the stockings have been discharged onto the table.

33. The combination in means for removing stockings from stocking forms, of a form; a carrier therefor; a guide for the carrier; means for turning the form from the vertical to the horizontal position; grippers for engaging the foot portion of a stocking and for holding the stocking while the form is removed therefrom; means for actuating the grippers; a table arranged to receive the stockings; a platform normally located above the table; and means for retracting the platform in the direction of movement of a stocking while the grippers retain the stocking so that it will be properly laid on the table in a flat condition.

34. The combination of a carrier; a stocking form thereon; a guide for the carrier; grippers for engaging the foot portion of a stocking to allow the form to be removed therefrom; means for actuating the grippers; a table located to receive the stockings; a platform normally mounted above the table and arranged to receive the stockings as they drop from the forms; two levers, one located in advance of the other and one connected to the other with a lazy tongs; and lever mechanism for imparting movement to the platform, the two levers being in the path of the carrier so that, after the form is withdrawn from the stocking, the carrier strikes first one lever to withdraw the platform and to allow the stocking to be discharged upon the table and then, upon the further movement of the carrier, it will contact with the second lever which will project the platform into its normal position.

35. The combination in a machine for removing stockings from stocking forms, of a carrier; a guide therefor; a form on the carrier; means for turning the form; grippers for engaging the stocking after the form is turned; means for actuating the grippers; a table arranged to receive the stockings after they are removed from the forms; and means for tilting the table to discharge a stocking therefrom.

36. The combination of a carrier; a guide therefor; a stocking form mounted on the carrier; means for turning the stocking form; grippers for engaging a stocking after the form is turned; means for actuating the grippers; a table located to receive the stockings; and mechanism for tilting the table after a given number of stockings have accumulated on the table so as to discharge the stockings therefrom.

37. The combination in means for removing stockings from stocking forms, of a carrier; guides therefor; a stocking form on the carrier; means for turning the form; grippers for engaging the foot of a stocking after the form has been turned; means for actuating the grippers; a table located so as to receive a stocking after it has been withdrawn from the form; a lever on which the table is mounted; a driven shaft; a cam on the shaft for returning the table to its normal position; a second cam mounted on a shaft; a notched wheel on the shaft of the second cam; a pin on the lever arranged to ride on the second cam; a pin on the first cam arranged to enter the notches in the notched wheel; a guide at the side of the first cam; and a hinged plate carried by the lever and adapted to be forced into the path of the first mentioned cam by the guide after a given number of stockings has been discharged onto the table and when the pin on the arm enters the recess in said second cam, thus allowing the stockings to be discharged from the table, which will be immediately moved to its normal position by the first cam acting upon the hinged plate.

38. In a machine for removing stockings from stocking forms, the combination of a bed having a rectangular guideway therein; a series of carriers; a stocking form pivotally mounted on each carrier; means for traversing the carriers in the guideway; means for drying stockings while traversing the guideway; means for turning the stocking forms from a vertical to a horizontal position; grippers for engaging the heel and the toe of a stocking so as to allow the form to be withdrawn from the stocking as it travels in the guideway; means for actuating the grippers; a table located to receive a stocking after the form has been withdrawn; means for tilting the table at intervals to discharge the stockings therefrom; and means for turning the form on its pivot, from the horizontal to the vertical position, to again receive a stocking.

39. The combination of a bed; a rectangular guide thereon; a series of carriers arranged to travel in the guide; a stocking form pivotally mounted on each carrier; mechanism for drying stockings while the carriers are traversing one of the longitudinal guides; means, at one end of the bed, for turning the stocking form from the vertical to the horizontal position while it is traversing one of the transverse guides; means for gripping the foot end of a stocking when the carrier reaches the end of said transverse guide and for retaining the stocking while the carrier is traversing the other longitudinal guide; means for turning the stocking form to the vertical position after the stocking has been removed therefrom; and mechanism for actuating the gripping means.

40. The combination in a machine for removing stockings from stocking forms, of a bed; a rectangular guide slot therein; a series of carriers arranged to travel in the said guide slot; pins projecting downwardly from each carrier; cams engaging the pins to traverse the carriers in the slot; a stocking form pivotally mounted on each carrier; rails on the bed for retaining the form in a vertical position; a cam plate for turning each form as its carrier traverses one of the transverse guide slots so as to turn the form from the vertical to the horizontal position; grippers for engaging the toe and the heel of a stocking; means for actuating the grippers; a table located so as to receive a stocking after it has been removed from a form; a reciprocating platform above said table; means in the path of each carrier, as it travels in one of the longitudinal guide slots, for actuating the platform so that the platform will receive the stocking as the form is removed therefrom and will, in turn, place the stocking on the table; and means for tilting the table at intervals to discharge an accumulated pile of stockings therefrom.

41. The combination of a bed having a rectangular guideway therein; a carrier arranged to travel in the guideway; a stocking form pivotally mounted on the carrier; grippers arranged at an angle beyond one end of the machine; mechanism for actuating the grippers; and mechanism for turning the stocking form, with a stocking thereon, onto the grippers so that the stocking form will be arranged at an angle with respect to the movement of the carrier and as the carrier withdraws the form from the stocking, it will allow the foot portion of the form to pass through the narrow ankle portion of the stocking and will act as a spreader for the leg portion of the stocking as it passes through the leg thereof.

42. The combination in a machine for removing stockings from forms, of a bed having a guideway therein; carriers arranged to travel in said guideway; forms on the carriers; means at one side of the machine for gripping the stockings on the forms; mechanism for actuating the gripping means; and a cam acting upon the carriers to remove the forms from the stockings, said cam having a steep section, whereby, at one revolution of the cam, the forms will be withdrawn from the stockings.

43. The combination in means for removing stockings from forms, of a carrier; a clamp head thereon having a V-shaped projection; a detachable clamp adapted to the head and having a recess to receive the projection; a stocking form having a V-shaped notch adapted to the projection; and means for clamping the parts to hold the form in proper position.

In testimony whereof, we have signed our names to this specification, in the presence of two subscribing witnesses.

HARRY COULSTON.
WALTER M. SCHWARTZ.

Witnesses:
Jos. H. KLEIN,
WM. A. BARR.